United States Patent [19]

Lazcano-Navarro et al.

[11] Patent Number: 4,780,133
[45] Date of Patent: Oct. 25, 1988

[54] PROCESS TO IMPROVE THE REFINING OF LIQUID METALS BY NATURAL GAS INJECTION

[76] Inventors: Arturo Lazcano-Navarro; Gregorio Vargas-Gutierrez; Carlos Maroto-Cabrera, all of Ave. Junco de la Vega #208, Colonia Roma 64700, Monterrey, Nuevo Leon, Mexico

[21] Appl. No.: 928,926
[22] Filed: Nov. 10, 1986
[51] Int. Cl.$^4$ ............................................. C22B 4/00
[52] U.S. Cl. ...................................... 75/10.39; 75/58; 75/59.19; 75/59.28
[58] Field of Search .................... 75/59.19, 58, 59.28, 75/10.39

[56] References Cited

U.S. PATENT DOCUMENTS

| | | | |
|---|---|---|---|
| 3,330,645 | 7/1967 | DeMoustier | 75/59.28 |
| 3,706,549 | 12/1972 | Knuppel | 75/59.19 |
| 4,382,817 | 5/1983 | Vayssiere | 75/59.29 |

*Primary Examiner*—Peter D. Rosenberg
*Attorney, Agent, or Firm*—Laurence R. Brown; Alfred J. Mangels

[57] ABSTRACT

A method for the improvement of the process for the refining of liquid metals by means of the injection of natural gas.

It is upon the lab and semi-industrial plant experience of the inventors of the present invention, that it was found that during the injection of natural gas into liquid metals, there is substantially no cracking of methane under usual conditions of pressure and temperature in the refining processes.

In such conditions, natural gas can be used as inert gas in metallurgical processes with technical and economical advantages over inert gases, introducing it through the bottom of the liquid bath. This practice has in addition, the property of reinforcing the process conditions, oxidizing or reducing, according to the slag in the molten bath.

4 Claims, No Drawings

PROCESS TO IMPROVE THE REFINING OF LIQUID METALS BY NATURAL GAS INJECTION

DESCRIPTION OF THE INVENTION

In the metallurgy of the liquid state, natural gas has been used mainly for: copper de-oxidation by means of the injection of reformed natural gas; annular cooling of the oxygen injection tuyeres installed in the bottom of metallurgical vessels, and in the desulphurization of pig iron, as a carrier gas for the desulphurization agents.

In the process of this invention, natural gas is used as a stirring gas in substitution of inert gases. This practice has, in addition, the effect of reinforcing the process conditions, oxidizing or reducing, according to the slag in the molten bath.

(a) Oxidizing conditions: the bottom injection of natural gas is made in combination with an oxidizing slag. The vigorous stirring increases the metal-slag and the metal-atmosphere interphase area, resulting in elimination from the molten metal of greater amounts of oxidizable elements (C, Mn, Si, P, Al) than that obtained in the conventional practice.

(b) Reducing conditions: the bottom injection of natural gas is made in combination with an appropriate reducing slag. The bottom gas stirring increases the metal-slag contact, making a faster transfer of sulphur and oxygen from the metal to the slag. The natural gas is burned out in the bath surface, consuming the atmosphere's oxygen and increasing the efficiency of the reducing conditions. The elimination of sulphur from the molten metal, by this practice, is greater than that obtained by conventional practices.

The residence time of natural gas inside the molten metal is small enough, so that there is substantially no cracking of methane. However, it is possible that cracking occurs near the bath surface, in a small amount. This case has two benefits:

It produces a reducing atmosphere ($H_2$), and the carbon deposition produces an additional stirring known as molten metal "boiling".

The natural gas injection is done through a ceramic, gas permeable device of the type which is not penetrated by the molten metal even when the gas flow is cut-off. Such ceramic, gas permeable devices are installed as plugs in the bottom of the metallurgical vessel and its arrangement depends on the number of them to be installed and on the flow pattern desired.

The natural gas injection practice, according to the present invention, can be applied in different areas of the steelmaking process. The following examples of the present invention are illustrative of the application of the method in steelmaking practices:

EXAMPLE 1

Steelmaking by combined blowing in oxygen converters

This process consists basically of oxygen injection with a lance, such as in the conventional practice, and bottom injection of natural gas through ceramic, gas permeable devices, porous plugs or tuyeres. The main objective of the process is to increase the efficiency of the reactions between metal, slag and gases (injected oxygen and the atmosphere). In this case, because the initial carbon content is high, its elimination is conducted in two steps to speed up the process:

A. Bottom injection of natural gas and oxygen by lance as in the conventional practice. When the carbon in the metal has values around 0.1%, the injection of oxygen by lance is stopped and the process then continues with the next step.

B. Bottom injection of natural gas at the same flow rate as the conventional practice using inert gas.

The molten bath stirring produced by natural gas injection is high enough to expose all the metallic mass to the oxidizing slag and the atmosphere. Under such conditions, the metallic surface has such oxygen potential that it is possible to decarburize to levels of 0.002% C.

EXAMPLE 2

Ladle treatment

In ladle metallurgy, natural gas injection can be applied in three basic operations:

A. Deep decarburization. Starting with low carbon contents (0.1% C), it is possible to get carbon levels of 0.002% only with bottom natural gas injection.

B. Desulfurization. The bottom natural gas injection in combination with an appropriate reducing slag is an efficient and fast desulfurization practice. By this practice it is possible to get levels of sulphur of 0.002% S in the liquid metal.

C. Vacuum degassing. The elimination of dissolved gases and the flotation of inclusions is carried out by bottom natural gas injection as the same flow rate levels as in the conventional practice using inert gas. In addition, natural gas is burned out at the bath surface, giving up the combustion enthalpy.

EXAMPLE 3

Pig iron desulfurization

Natural gas is bottom injected in a metallurgical vessel which can be a transfer ladle or a transfer car in combination with desulfurization agent additions.

This practice increases the sulphur rate transfer to the slag and reduces the time of treatment, thereby increasing the desulfurizing agents yield.

EXAMPLE 4

Electric arc furnace steelmaking

The bottom injection of natural gas can be applied in the EAF process with different purposes according to the steelmaking stage:

A. Oxidizing period: the bottom natural gas injection is done in combination with an appropriate oxidizing slag. The carbon and phosphorous level obtained by this practice can be as low as 0.002% due to the high metal-slag contact that is produced by the natural gas injection.

B. Reducing period. The bottom natural gas injection is done in combination with an appropriate reducing slag. The desulfurization level that is obtained by this practice is higher and faster than that obtained by conventional practices. In addition, the product is cleaner due to the inclusion flotation and due to less refractory wear because of the reduced time of the operation.

What is claimed as new and desired to be protected by U.S. Letters Patent is set forth in the appended claims:

1. A method for refining liquid metals that are contained in a vessel that includes molten metal and slag by introducing a stirring gas into the molten metal to increase interphase contact between the molten metal and the slag and to reduce the amounts of undesirable elements in the molten metal, the improvement comprising: introducing natural gas into the molten metal through a ceramic, gas permeable device of the type that is not penetrated by liquid metal when gas flow is stopped, the gas permeable device being secured in the bottom of a steel making vessel in which the molten metal and slag are contained, vigorously stirring the molten metal and slag contained in the vessel by the introduction of the natural gas at a flow rate that is sufficient to effect vigorous stirring of the molten metal to increase the molten metal-slag and the molten metal-atmosphere interphase areas to eliminate undesired elements from the molten metal and that is sufficient to avoid substantial cracking of methane within the molten metal, and wherein the vessel includes an oxidizing slag and the natural gas reduces the carbon and phosphorous levels in the molten metal.

2. A method for refining liquid metals that are contained in a vessel that includes molten metal and slag by introducing a stirring gas into the molten metal to increase the interphase contact between the molten metal and the slag and to reduce the amounts of undesirable elements in the molten metal, the improvement comprising: introducing natural gas into the molten metal through a ceramic, gas permeable device of the type that is not penetrated by liquid metal when gas flow is stopped, the gas permeable device being secured in the bottom of a steel making vessel in which the molten metal and slag are contained, vigorously stirring the molten metal and slag contained in the vessel by the introduction of the natural gas at a flow rate that is sufficient to effect vigorous stirring of the molten metal to increase the molten metal-slag and the molten-atmosphere interphase area to eliminate undesired elements from the molten metal and that is sufficient to avoid substantial cracking of methane within the molten metal, and wherein the natural gas is burned at the molten metal surface to consume oxygen and to increase reducing conditions in the atmosphere above the molten metal, and wherein the vessel includes a reducing slag and the natural gas increases the transfer of sulfur and oxygen from the molten metal to the slag.

3. A method as claimed in claim 1, wherein the process includes the step of injecting oxygen by lance simultaneously with the introduction of natural gas until the carbon level in the molten metal has been reduced to about 0.1%, and then terminating the injection of oxygen while maintaining the flow of natural gas to further decarburize the molten metal.

4. A method as claimed in claim 1, wherein the process is conducted in an electric arc furnace.

* * * * *